June 21, 1960 G. RAISBECK 2,942,211

TRANSPOSED LAYER CONDUCTOR

Filed Nov. 26, 1956 2 Sheets-Sheet 1

INVENTOR
G. RAISBECK
BY David P. Kelley
ATTORNEY

June 21, 1960 G. RAISBECK 2,942,211
TRANSPOSED LAYER CONDUCTOR
Filed Nov. 26, 1956 2 Sheets-Sheet 2

INVENTOR
G. RAISBECK
BY David P. Kelley
ATTORNEY

2,942,211

TRANSPOSED LAYER CONDUCTOR

Gordon Raisbeck, Bernards Township, Somerset County, N.J., assignor to Bell Telephone Laboratories, Incorporated, New York, N.Y., a corporation of New York Filed Nov. 26, 1956, Ser. No. 624,309

4 Claims. (Cl. 333—96)

This invention relates to electrical transmission lines for the transmission of a wide band of frequencies, and, more particularly, to such transmission lines which have three or more conducting elements.

It is an object of this invention to provide an electrical transmission line having an increased transmission efficiency.

It is another object of this invention to provide an electrical transmission line of the concentric conductor type having reduced attenuation over a band of frequencies.

In the transmission of electromagnetic waves, the current distribution which is substantially uniform throughout the cross-sectional area of a conductor at very low frequencies becomes nonuniform as frequency is increased. Let us consider, for example, the case of a solid conductor to which are applied waves of increasing frequency. At direct-current and very low alternating-current frequencies the current is substantially uniformly distributed throughout the cross-sectional area of the conductor and the resistance of the conductor and hence the conductor loss is at a minimum. As the frequency is increased, the current density becomes a maximum at that surface of the conductor which is exposed to the main field of the waves, which, in the present example, is the outer surface, and decreases as distance from the field increases, i.e., toward the center of the conductor. The rate at which the current density decreases is dependent upon the frequency and the material of the conductor and, for most conducting materials, at high frequencies the current density at the center of the conductor becomes negligible while the current density at the conductor surface is a maximum. This phenomenon is commonly known as "skin effect" and a "skin depth" is defined as the distance measured inwardly from the surface of the conductor in which the current density will decrease by one neper, i.e., the point at which the current density becomes $$\frac{1}{e}$$

times the density at the surface of the conductor, where $e$ is the natural logarithm base. Because of the skin effect phenomenon the alternating-current resistance of the conductors increases as the frequency increases, becoming quite large at the higher frequencies, necessitating frequent amplification of the signal where the conductor is used in a transmission system of appreciable length.

It has long been recognized that the alternating-current resistance of a conductor to high frequencies can be substantially reduced over a wire band of such frequencies if the conductor is formed of a number of conducting elements or members connected in parallel and transposed often so that each conductor receives its share of exposure to the main field. This amounts to forcing the current to distribute itself over the cross-sectional area of the composite of conducting elements, thereby increasing the total current carrying area. It follows, then, that the alternating-current resistance is decreased substantially and the frequency dependency of the alternating-current resistance is likewise decreased.

Another way of looking at the reason for the reduction in losses brought about by transposing the conductors is based upon the fact that a transmission line having three parallel conductors can support two modes of transmission over a wide band of frequencies. If two pure modes propagate along the line with different wave velocities, the currents which they induce in the conductors will gradually fall in and out of phase with each other throughout the length of the line. When the currents are in phase, the losses are greater than when the currents are out of phase. Over a long length of line, the phases pass through many cycles, and the power loss averages out to be the same as if the pure modes were propagated independently. If, over a short length of line, two modes are propagated so that there is a substantial cancellation of currents, the losses are reduced so long as the currents substantially cancel. When the differential phase shift between modes begins to be appreciable, it is necessary, in order to forestall an increase in losses, to electrically terminate the line and launch the power onto a new section of line. This termination of the line and relaunching of the power is expeditiously accomplished by periodically transposing two of the conductors of the three-conductor line, such as, for example, in the manner shown in the copending United States patent applications of W. H. Doherty, Serial Nos. 519,022, now Patent 2,779,814, January 29, 1957, 519,108, and 519,206, now Patent 2,886,628, May 12, 1959, which were filed on June 30, 1955, or in any suitable manner known in the art.

Transposition of the conductors in a transmission line results in decreased losses and increased efficiency over a band of frequencies. The amount of reduction in losses and increase in efficiency is, however, dependent upon such matters as the frequency of the electromagnetic waves to be transmitted, the dimensions of the conductors themselves, and the relationships among certain of these dimensions. Analysis and experimentation have shown that there exist certain optimum dimensions for transposed conductors which produce a maximum reduction in attenuation in the transmission line.

In accordance with the present invention, a transmission line having three or more parallel conducting members is provided which is a great improvement in many respects over conventional two-conductor transmission lines. In an illustrative embodiment of the invention a coaxial cable is constructed having a composite center conductor. The center conductor comprises an inner conducting member surrounded by an intermediate conducting member which is concentric with and insulated from the center conductor. The inner conducting member and the intermediate conducting member are periodically transposed in any suitable manner such as, for example, any one of the transposition arrangements shown in the aforementioned copending applications of W. H. Doherty.

In accordance with one feature of this invention, the thickness of the intermediate member is optimized for the particular frequencies of operation, so that minimum attenuation is realized.

In accordance with another feature of this invention the ratio of the diameters of the outer and inner conductors is likewise optimized so that a maximum reduction in attenuation and increase in transmission efficiency is obtained.

The invention will be more readily understood by referring to the following description in conjunction with the accompanying drawings, in which.

Figure 1:
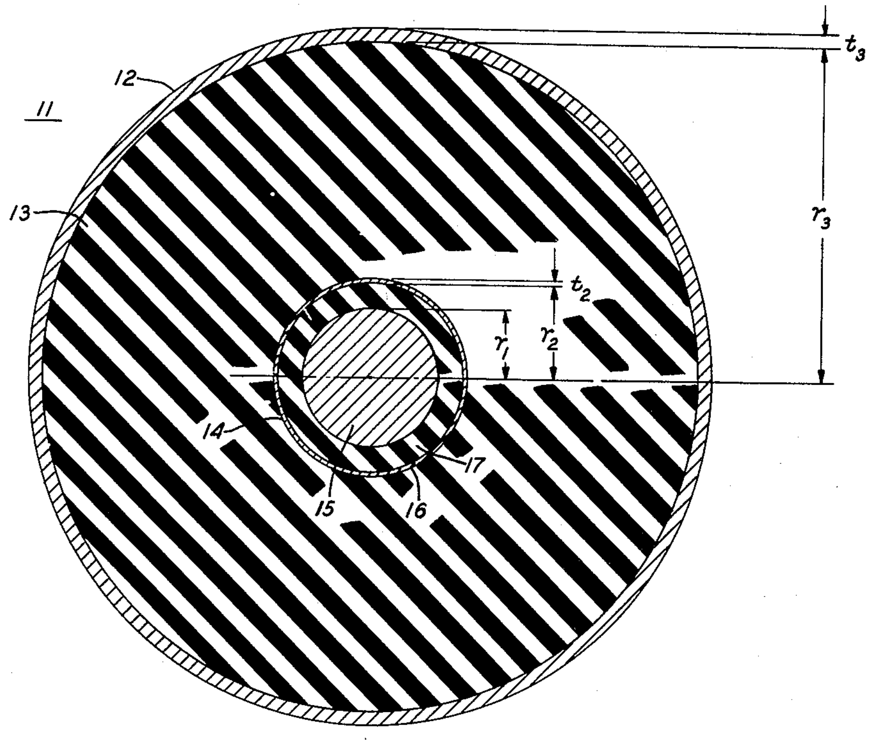
Fig. 1 is a cross section of a coaxial type cable embodying the principles of the present invention.

Turning now to Fig. 1, there is shown, by way of example, a coaxial type transmission line 11, comprising an outer conductor 12, a main dielectric member 13, and a composite inner conductor 14. Conductor 14 comprises an inner conducting member 15 and a thin outer conducting member 16 concentric with member 15 and insulated therefrom by insulating member 17. Both the dielectric member 13 and insulating member 17 may be of any dielectric material suitable for use in coaxial cables, while conductor 12 and conducting members 15 and 16 are of any suitable conducting material, such as, for example, copper.

In order that the optimum dimensions and proportions for a coaxial line of the type shown in Fig. 1 may be determined, it is necessary to investigate the transmission losses in such a line. The losses in a solid conductor with a coaxial return are easily computed. A table of such losses is found in "Radio Engineers' Handbook" by F. E. Terman, (McGraw-Hill, 1943), on page 31. The losses that are tabulated are for an isolated solid conductor. However, as long as there is symmetry about the axis of a solid conductor, as is the case with a circular coaxial line, the conductor may be regarded as isolated. The losses for a tubular conductor with coaxial return, where the current is returned either inside or outside, are likewise given in the aforementioned "Radio Engineers' Handbook" on page 33. In the case of the cable of Fig. 1, where the intermediate tubular conductor 16 has return current both inside and outside the tube, the determination of the losses becomes quite complicated. In an article entitled "The Electromagnetic Theory of Coaxial Transmission Lines and Cylindrical Shields" by S. Schelkunoff, Bell System Technical Journal, vol. 13, October, 1934, pages 532–579, the case where the tubular conductor has return current both inside and outside the tube is studied. The following analysis is based upon that study.

Suppose the currents in the conductors of the cable of Fig. 1 are as follows:

$$I_1 e^{j\omega\tau - j\beta Z} = \text{current in conducting element } \mathbf{15} \qquad (1)$$

$$I_2 e^{j\omega\tau - j\beta Z} = \text{current in conducting element } \mathbf{16} \qquad (2)$$

$$I_3 e^{j\omega\tau - j\beta Z} = \text{current in conductor } \mathbf{12} \qquad (3)$$

where $$I_1 + I_2 + I_3 = 0 \qquad (4)$$

and $\omega$ is the frequency in radians per second, $\tau$ is time in seconds, $\beta$ is the phase constant, which is assumed to be approximately the same for both modes of propagation, and Z is distance measured along the longitudinal axis in the direction of propagation. Assuming the attenuation to be small, which is a valid assumption since the length of line under consideration is short, then the total loss per unit length of cable 11 is $$L = \frac{1}{2}|I_1|^2 R^1 + \frac{1}{2}[|I_1|^2 R_{aa} + (I_1\bar{I}_3 + \bar{I}_1 I_3) R_{ab} + |I_3|^2 R_{bb}] + \frac{1}{2}|I_3|^2 R_3 \qquad (5)$$

$$R_1 = \frac{1}{2\pi r_1}\sqrt{\frac{\omega\mu_1}{g_1}}\, Re\left(\frac{J_0[(1+i)r_1/\delta_1]}{J_1[(1+i)r_1/\delta_1]}\sqrt{i}\right) \qquad (6)$$

$$R_3 \cong \frac{1}{2\pi r_3}\sqrt{\frac{\omega\mu_3}{g_3}}\,\frac{\sinh u' + \sin u'}{\cosh u' - \cos u'} \qquad (7)$$

$$R_{aa} \cong \frac{1}{2\pi r_2}\sqrt{\frac{\omega\mu_2}{g_2}}\,\frac{\sinh u + \sin u}{\cosh u - \cos u} \qquad (8)$$

$$R_{bb} \cong \frac{1}{2\pi (r_2 + t_2)}\sqrt{\frac{\omega\mu_2}{g_2}}\,\frac{\sinh u + \sin u}{\cosh u - \cos u} \qquad (9)$$

$$R_{ab} \cong \frac{1}{2\pi\sqrt{r_2(r_2+t_2)}}\sqrt{\frac{\omega\mu_2}{g_2}}\,\frac{\sinh\frac{u}{2}\cos\frac{u}{2} + \cosh\frac{u}{2}\sin\frac{u}{2}}{\cosh u - \cos u} \qquad (10)$$

and $r_1$=radius of conducting member 15
$r_2$=inner radius of conducting member 16
$r_3$=inner radius of conductor 12
$t_2$=thickness of conducting member 16
$t_3$=thickness of conducting member 12
$\mu_1, \mu_2, \mu_3$=magnetic permeability of members 15, 16, and 12 respectively,
$g_1, g_2, g_3$=conductivity of members 15, 16, and 12 respectively,
$\delta_1, \delta_2, \delta_3$=skin depth of members 15, 16, and 12 respectively, $$u' = \frac{2t_3}{\delta_3}$$

$$u = \frac{2t_2}{\delta_2}$$

Of the five loss terms given on the right-hand side of Equation 5, the first term represents the ohmic loss in the center conducting member 15 and the fifth term represents the loss in outer conductor 12. An examination of the loss terms within the brackets in Equation 5 reveals that only the term involving $R_{ab}$ depends upon the relative phases of $I_1$ and $I_3$, and involves the factor $$(I_1\bar{I}_3 + \bar{I}_1 I_3) = 2|I_1||I_3|\cos\theta \qquad (11)$$

where $\theta$ is the angle of phase difference between $I_1$ and $I_3$. It is readily apparent that any reduction in losses depends upon $R_{ab}$ being large and $I_1$ and $I_3$ being such that the term involving $R_{ab}$ is negative.

Figure 2:
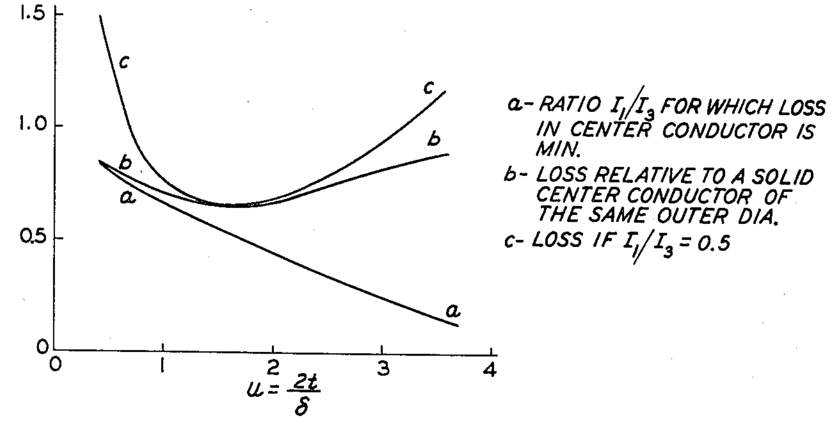
Fig. 2 is a chart of certain characteristics of the inner conductor of the cable of Fig. 1 as compared to a solid inner conductor.

If we assume that the skin depth, the thickness of the dielectric layer 17 and the thickness $t_2$ of conducting member 16 are all small relative to the radius $r_1$ of member 15, then Equations 6 through 10 are greatly simplified and a comparison of the losses in conducting members 15 and 16, taken as one composite conductor 14, with the loss in a solid conductor of the same overall dimensions of conductor 14, is possible. Such a comparison is charted in Fig. 2. In Fig. 2, the abscissa is in terms of the dimensionless ratio $$\frac{2t}{\delta}$$

and hence is valid for substantially any frequency in the frequency range under consideration. The ordinate is in dimensionless units. Curve *a* in Fig. 2 is the ratio of the current $I_1$ in the innermost conducting member 15 to the current $I_3$ in the outermost conductor 12 for which loss is a minimum, curve *b* is the loss in composite conductor 14 relative to the loss in a solid conductor of the same outer diameter, and curve *c* is the loss in composite conductor 14 relative to the loss in a solid inner conductor of the same outer diameter when the current is evenly divided between conductors 15 and 12. Examination of the graph of Fig. 2 reveals that when curve *a* has a value of approximately 0.5 on the ordinate, both curves $b$ and $c$ are at a minimum value of approximately 0.65 on the ordinate. In other words, for that particular current distribution composite conductor 14 exhibits 35 percent less loss than a solid conductor having the same outer dimensions.

In a normal coaxial line 78 percent of the effective resistance in the center conductor and 22 percent is in the outer conductor. As demonstrated by curves $b$ and $c$ of Fig. 2, when the current is evenly distributed between the center and intermediate conductor of the cable of Fig. 1, the resistance of the composite conductor 14 is 65 percent of that of a solid conductor.

Figure 3:
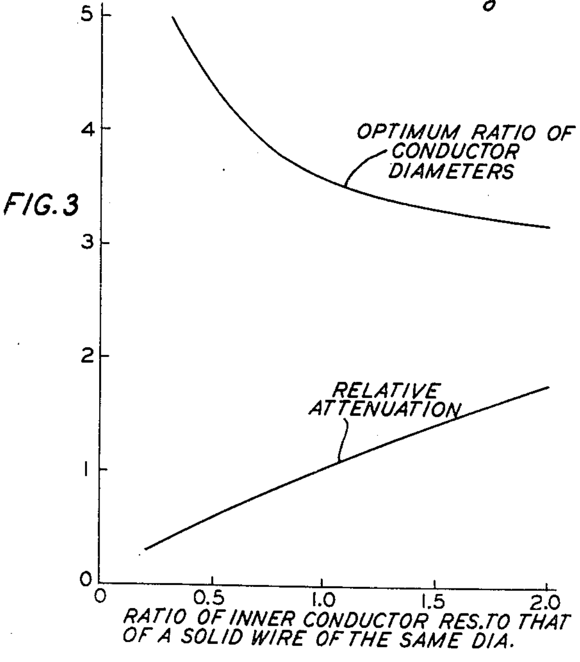
Fig. 3 is a graph of the optimum ratios of the conductor diameters versus the variations in the ratio of the resistance of the inner conductor of Fig. 1 to the resistance of a solid conductor.

In Fig. 3 there is shown a plot of the optimum ratio of the outer conductor diameter to the inner conductor diameter. As can be seen from Fig. 3, where the composite inner conductor 14 of the cable 11 of Fig. 1 has the same resistance as a solid inner conductor of the same dimensions, the optimum ratio of the diameters is 3.59, a value well known to workers in the art. However, when the resistance of composite conductor 14 is 65 percent of that of a solid conductor, the optimum ratio of the diameters is approximately 3.99.

Figure 4:
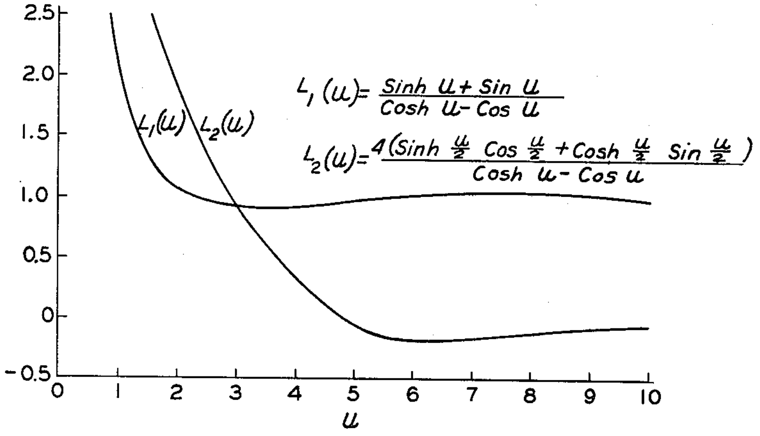
Fig. 4 is a graph showing the variations in certain of the parameters involved.

Thus far we have considered the behavior of a composite conductor such as conductor 14 of Fig. 1 as compared to a solid conductor of the same dimensions. It has been shown that such a conductor has a minimum resistance when the currents in the conducting elements of the composite conductor are approximately equal. Such equality of currents is advantageously maintained by transposing the conducting elements in any of a number of suitable ways, such as, for example, the forms of transpositions shown in the aforementioned copending applications of W. H. Doherty. It has also been shown that when such a composite conductor is used in a coaxial cable, the ratio of outer to inner conductor diameters which yields optimum performance is 3.99 or approximately 4. The foregoing conclusions are based upon upon the assumption that the thickness $t_2$ of intermediate conductor 16 was small. In order that maximum benefits may be obtained by using a composite conductor such as conductor 14 of Fig. 1, it is necessary to determine the value of $t_2$ at which performance is optimum. From Equations 8, 9, and 10 it is apparent that the terms involving $u$ are the terms which are of greatest importance in determining the value of $t_2$ inasmuch as $u$ relates the thickness $t_2$ to the frequency in terms of the skin depth $\delta$. In Fig. 4 these terms are plotted for different values of the parameter $u$. The total loss attributable to these terms is, from Equations 8, 9, and 10

$$L=k_1^2|I_1^2|+k_2|I_3^2|\frac{\sinh u+\sin u}{\cosh u-\cos u}$$

$$+4k_1 Re(\bar{I}_1\bar{I}_3)\frac{\sinh\frac{u}{2}\cos\frac{u}{2}+\cosh\frac{u}{2}\sin\frac{u}{2}}{\cosh u-\cos u}$$

$$=k_1|I_1^2|+k_2|I_3^2|L_1(u)+4k_1 Re(\bar{I}_1\bar{I}_3)L_2(u) \tag{12}$$

where $$I_1=\frac{I_3}{2}$$

and $k_1$ and $k_2$ are constants independent of $I_1$ and $I_3$. If the constant part, which does not depend on $u$ is ignored, Equation 12 becomes $$L=\frac{(\sinh u+\sin u)+\sinh\frac{u}{2}\cos\frac{u}{2}+\cosh\frac{u}{2}\sin\frac{u}{2}}{\cosh u-\cos u} \tag{13}$$

By differentiating with respect to $u$ and setting the result equal to zero, Equation 13 has a minimum, when $I_1$ is equal to minus $$\frac{I_3}{2}$$

when $$\cos\frac{u}{2}=\frac{1}{2}\cosh\frac{u}{2} \tag{14}$$

and, therefore, $$\frac{u}{2}\cong 0.82=\frac{t}{\delta} \tag{15}$$

An examination of Fig. 2 shows that both curves $b$ and $c$ have their minimum value when $u$ is equal to approximately 1.64. However, it is readily apparent from Fig. 2 that a substantial reduction in loss can be had for values of $u$ between one and two, the corresponding values of $t$ ranging from 0.5 skin depths to 1.0 skin depths.

Figure 5:
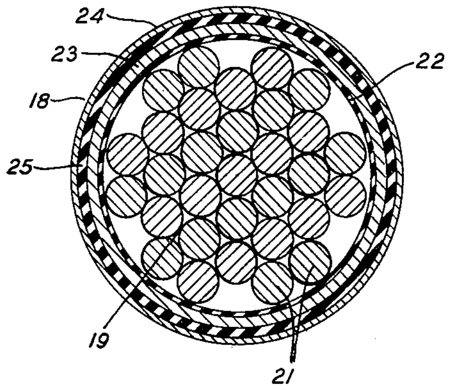
Fig. 5 is a cross-sectional view of a conductor embodying the principles of the invention.

In Fig. 5 there is shown a cross section of the center conductor 18 and core 19 of a steel core cable, such as a submarine cable, utilizing the principles of the present invention. For simplicity, the remaining portions of the cable, including the outer conductor, are not shown. Core 19 comprises a plurality of strands 21 of steel or similar material which are intended to impart strength and flexibility to the structure. Surrounding core 19 is a plastic insulating sheath 22 of any suitable material. Conductor 18 comprises an inner conducting shell 23 and an outer conducting shell 24 spaced from shell 23 by a thin layer of insulating material 25. For optimum performance of the conductor arrangement of Fig. 5, where conducting shells 23 and 24 are transposed to maintain current balance, the thicknesses of shells 23 and 24 must be properly chosen. As has been shown in the foregoing, the thickness of shell 24 should be 0.82 skin depths at the highest frequency of operation contemplated. The optimum thickness of inner shell 23 is readily obtained from the article entitled "Electromagnetic Theory of Coaxial Transmission Lines and Cylindrical Shields" by S. A. Schelkunoff, Bell System Technical Journal, October 1934, pages 532–579. On pages 559 and 560 of that article it is shown that the optimum thickness of a tubular inner conductor is $$\frac{\pi}{2}$$

times the skin depth at the frequency of operation. Thus in conductor 18 of Fig. 5 shell 23 has a thickness of $$\frac{\pi}{2}$$

times the skin depth, shell 24 has a thickness of approximately 0.82 times the skin depth, and the shells are periodically electrically transposed so as to carry substantially equal amounts of current. With such a structure, losses are minimized over a wide band of frequencies.

It is to be understood that the foregoing embodiments are merely illustrative of the principles of the invention as applied to transposed conductors, and that application to other types of conductors is within the scope of the invention.

What is claimed is:

1. A transmission line for electromagnetic waves comprising an inner current-carrying member, an outer current-carrying member coaxial therewith, and a thin intermediate current-carrying member between said inner and outer members and concentric therewith, said thin intermediate member having a thickness between one-half and one skin depth at the highest frequency of electromagnetic waves, means for causing said inner member and said intermediate member to carry substantially equal amounts of current comprising periodic electrical transpositions between said inner member and said intermediate member, and the ratio of the inside diameter of the outer member to the outside diameter of the intermediate member being approximately 4 to 1.

2. A transmission line for electromagnetic waves according to claim 1 wherein the thickness of said intermediate member is approximately 0.82 skin depths at the highest frequency of electromagnetic waves.

3. A center conductor assembly for use in a cable of the submarine type comprising a stranded core member, an inner current-carrying member surrounding said core member and insulated therefrom, said inner conducting member having a thickness of approximately $$\frac{\pi}{2}$$

skin depths at the highest frequency of operation of said cable, a thin outer current-carrying member surrounding said inner member and insulated therefrom, the thickness of said outer member being between one-half and one skin depth at the highest frequency of operation of said cable, and means for causing said inner member and said outer member to carry substantially equal amounts of current comprising periodic electrical transpositions between said inner member and said outer member.

4. A center conductor assembly for use in a cable of the submarine type according to claim 3 wherein the thickness of said outer member is approximately 0.82 skin depths at the highest frequency of operation of said cable.

References Cited in the file of this patent

UNITED STATES PATENTS

| | | |
|---|---|---|
| 2,769,148 | Clogston | Oct. 30, 1956 |
| 2,779,814 | Doherty | Jan. 29, 1957 |

OTHER REFERENCES

Assignee's copending application 478,990, Black and Morgan, filed December 31, 1954.